Aug. 19, 1941.    J. TRUMBLE ET AL    2,253,153
MULTIPLE SPINDLEHEAD FOR DRILLING, TAPPING,
REAMING, AND OTHER LIKE OPERATIONS
Filed Jan. 30, 1940    2 Sheets-Sheet 1
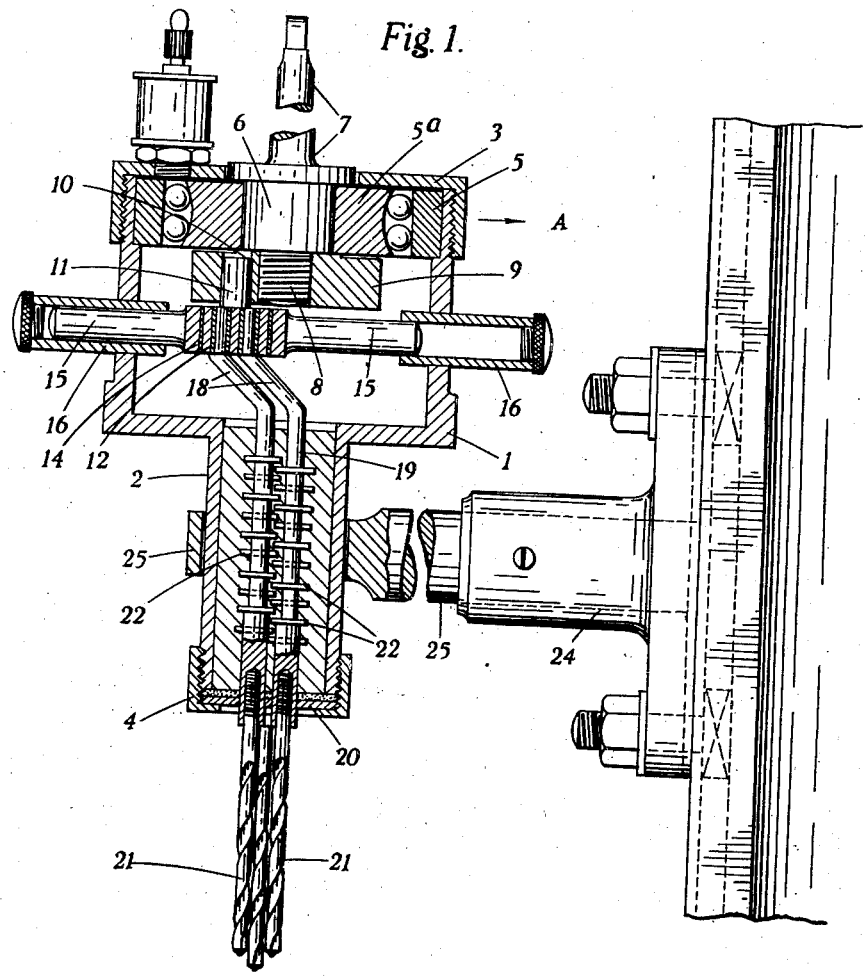
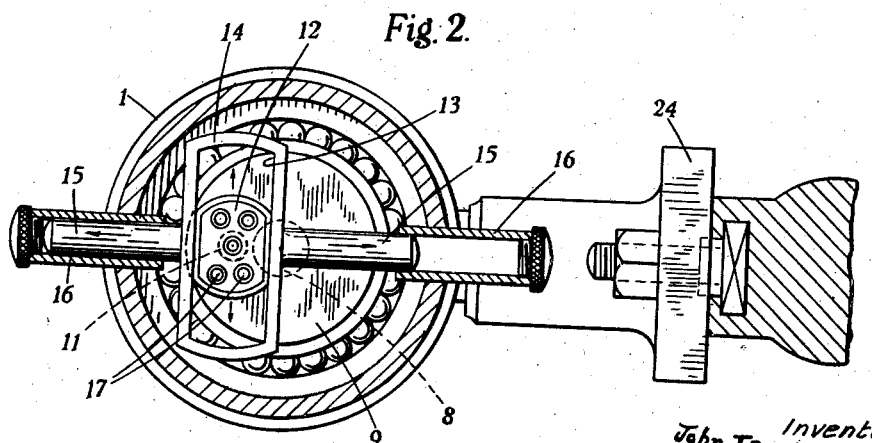
Inventors
John Trumble
William Charter Heilman
by
their Attorney Aug. 19, 1941.  J. TRUMBLE ET AL  2,253,153
MULTIPLE SPINDLEHEAD FOR DRILLING, TAPPING,
REAMING, AND OTHER LIKE OPERATIONS
Filed Jan. 30, 1940  2 Sheets-Sheet 2
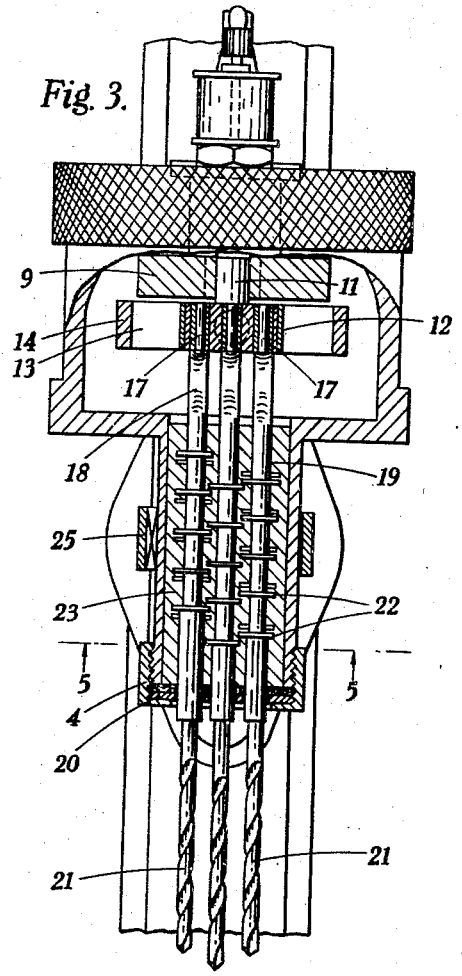
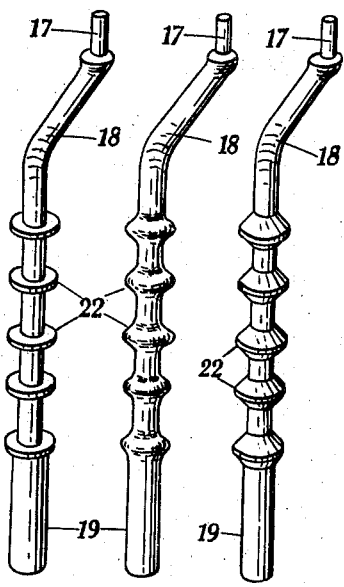
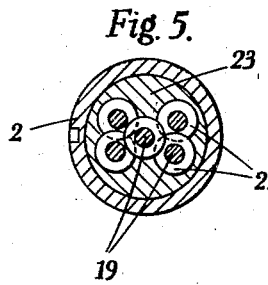
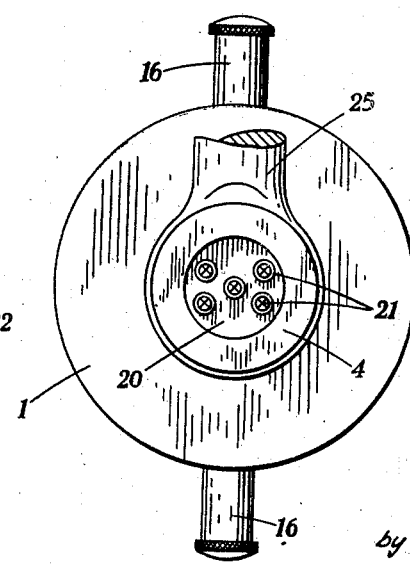
Inventors
John Trumble
William Charter Hillman
by
their Attorney Patented Aug. 19, 1941

2,253,153

UNITED STATES PATENT OFFICE 2,253,153

MULTIPLE SPINDLEHEAD FOR DRILLING, TAPPING, REAMING, AND OTHER LIKE OPERATIONS

John Trumble and William Charter Hillman, London, England

Application January 30, 1940, Serial No. 316,296
In Great Britain January 6, 1939

4 Claims. (Cl. 77—22)

This invention relates to multiple spindle heads for drilling, tapping, reaming and like operations of the kind comprising a plurality of spindles which are all rotated simultaneously.

In spindle heads of the above type at present in use the spindles are usually interconnected by means of gearing.

The object of the present invention is to provide a multiple spindle head of the type specified in which the usual gear interconnection is dispensed with, and replaced by means which permit the tool spindles, when so required, to be grouped in closer parallel association than is possible with the usual gear interconnection.

According to the present invention each tool spindle is in driving connection with a driving means common to all or a group of said spindles through a bent member or crank formed integral with or otherwise directly associated with the inner end of each spindle.

In a spindle head according to one embodiment of the invention the outer extremity of each bent member or crank is eccentric to its associated tool spindle but axially parallel thereto to provide a journal which fits rotatably within a bearing in a head member common to all said journals. Alternatively the journals may be carried by the head member, the necessary bearings being formed in or provided on the outer ends of the bent members or cranks. This head member is in turn provided with a journal pin which is a turning fit within a bearing recess or hole in the lower end of and eccentric to the turning axis of the main driving spindle of the tool head or vice versa.

The head member which engages the aforesaid crank extremities is constrained bodily to traverse a circular path when the main driving spindle is rotating by means of a transversely slotted guide member within the slot of which it is slidably fitted. This guide member is provided with oppositely extending and aligned spindles which work within fixed bearings so situated in relation to the body of the guide member as to permit the same to reciprocate laterally therebetween as the head member follows the circular path of movement.

This reciprocating movement of the guide member may be utilised to operate another mechanism or device such as a pump for supplying lubricating fluid to the work. For this purpose one or both of the aligned spindles supporting the guide member may each constitute a ram of the pump.

Alternatively the aligned spindles may be dispensed with by arranging slides or other means of support within the casing for the guide member.

A suitable thrust bearing is arranged within the length of each tool spindle so that end pressure on the tool spindle is not transmitted to its driving crank. Such a thrust bearing may simply be made by forming each tool spindle intermediate its length with a suitable number of circular enlargements and enclosing the same in a solid or split white metal or other suitable bearing. Where the tool spindles are required to be in close association with each other the thrust bearings may be vertically staggered so that the thrust bearings of one spindle are at a different level to the thrust bearings of the spindles adjacent to it.

In operation, rotation of the main driving spindle causes the head member to move in a circular path but without rotary movement within itself and this in turn simultaneously rotates the engaged cranks and through them the associated tool spindles.

When the spindles are so closely associated that it is impossible to fit tool chucks to their outer ends, the tools may be held in position by, for example, forming a screw thread on the rear end of the tool and screwing the same into a tapped hole provided in the outer end of the tool spindle, or the same may be soldered thereto.

In order that the invention may be clearly understood and carried into effect a practical example of a tool head according to the above embodiment will now be described by aid of the accompanying drawings in which:

Fig. 1 is a side view of the tool head, in part sectional elevation, showing the same in position in a suitable guide, which in turn is affixed to the vertical slide of a drilling machine.

Fig. 2 is a transverse section taken on Fig. 1 showing, in underside plan, the head member and other parts of the driving means.

Fig. 3 is a view, also in part sectional elevation, of the tool head when viewed in the direction of the arrow A in Fig. 1.

Fig. 4 is an underside plan view of Fig. 3.

Fig. 5 is a transverse section on the line 5—5 in Fig. 3 showing the grouping of the tool spindles and the staggered arrangement of the circular enlargements when embedded in a white metal or other suitable filling.

Fig. 6 illustrates in perspective three of the several forms of tool spindle which may be used in a tool head according to the present invention.

The tool head illustrated comprises a casing consisting of two concentric circular portions, an upper and larger portion 1 and a lower and smaller portion 2, said portions being enclosed by end covers 3 and 4 respectively.

The interior of the portion 1 of the casing is enlarged at its upper end to receive the outer ring 5 of a ball bearing, the inner ring 5a thereof being mounted on a circular portion 6 forming part of the main driving spindle 7.

Beneath the circular portion 6 is a screwed spigot 8 on which is mounted a disc 9. This disc constitutes a crank for which purpose it is drilled eccentrically to provide a bearing 10 for engagement by a crank-pin 11 placed centrally of and carried by the head member 12.

The head member 12 is substantially rectangular in shape, see Fig. 2, and is mounted, with a sliding fit, within an elongated slot 13 in a guide member 14. This guide member is supported, transversely of the casing, by means of oppositely extending and aligned spindles 15 which work within tubular bearings 16 extending through opposite sides of the enlarged portion 1 of the casing.

The head member 12 is drilled and bushed to provide a group of bearings corresponding in spacing with the desired grouping of the tool spindles and such bearings each receive a journal portion 17 formed at the upper end of the cranked portion 18 of each tool spindle 19. The lower ends of these tool spindles extend through an end bearing plate 20 at the lower end of the casing portion 2, said bearing plate being drilled to provide holes for the tool spindles which correspond in number and spacing with the bushed bearings in the head member 12. The lower end of each tool spindle is drilled axially or otherwise constructed to hold in driving engagement a drill 21 or other required and suitable tool.

So that end thrust on the tool spindles is not transmitted to their crank portions each tool spindle is provided with a thrust bearing. This bearing, in the example illustrated, is formed by providing the straight portion of each tool spindle with a plurality of circular enlargements 22 and enclosing the same when the tool is assembled in a body 23 of white metal or other antifriction metal which is poured into the interior of the portion 2 of the casing when the tool spindles have been placed in position. Alternatively, where space permits, the portion of each spindle having the aforesaid enlargements may each be enclosed in a split bearing. These circular enlargements may be of any suitable form and three examples thereof are shown in Fig. 6. In the example of tool illustrated the circular enlargements on one spindle are arranged in staggered relationship to those on the adjacent spindles in consequence of the close assembly of the spindles.

In the drawings is illustrated a simple form of mounting for use in retaining the spindle head in position on a drilling machine and for preventing the same from turning about its vertical axis. This mounting comprises a bracket 24 which is attached to the vertical slides of the drilling machine at the required height above the work table. Projecting from this bracket is an arm 25 the outer end of which is bored so as slidably to embrace the outside of the portion 2 of the casing of the spindle head, the tool as a whole being prevented from turning by a suitable key connection and, when in use, supported by an engagement between the upper end of the main driving spindle 7 and the chuck or its equivalent, not shown, of the drilling machine.

Whilst the tool illustrated is shown as comprising but a single group of tool spindles it will of course be understood that the same may comprise more than one group, which groups may be interconnected so that both or all of the same will be driven simultaneously through a single driving spindle common to all the groups or by two or more separate spindles.

It will also be understood that the tool is to be constructed with any predetermined spindle grouping and spacing and that said spindles may be grouped about a common centre, as an aligned or staggered column, or otherwise, as determined by the work to be executed.

What we claim is:

1. A spindle head of the type specified comprising a plurality of tool spindles grouped in parallel association, a bent member formed integral with the inner end of each tool spindle, the other end of each bent member having a bearing portion which is eccentric to its associated tool spindle but axially parallel thereto, a head member having a plurality of recesses, which are grouped in the same parallel association as the tool spindles to form rotatable connections with the extremities of said bent members, a reciprocably mounted guide member having a transverse slot in which the head member is slidably mounted, a main driving spindle, and means eccentric to the axis of the main driving spindle forming a driving connection between said spindle and said head member whereby the rotation of the main driving spindle causes the head member bodily to traverse a circular path and so rotate the tool spindles simultaneously through their bent members.

2. A spindle head according to claim 1 wherein a thrust bearing is arranged within the length of each tool spindle to protect each bent member from end pressure.

3. A spindle head according to claim 1 wherein thrust bearings are arranged within the length of each tool spindle to protect each bent member from end pressure, said thrust bearings consist of circular projections on the straight portions of the tool spindles embedded in a mass of antifriction metal, said metal being poured into position after the spindles have been assembled within an enclosing casing.

4. A spindle head of the type specified comprising a plurality of tool spindles grouped in parallel association, a bent member formed integral with the inner end of each tool spindle, the other end of each bent member having a bearing portion which is eccentric to its associated tool spindle but axially parallel thereto, a head member having a plurality of recesses, which are grouped in the same parallel association as the tool spindles to form rotatable connections with the extremities of said cranks, a reciprocably mounted guide member having a transverse slot in which the head member is slidably mounted, projecting spindles extending from opposing sides of said guide member and bearings in which said spindles reciprocate, a main driving spindle, and means eccentric to the axis of the main driving spindle forming a driving connection between said spindle and said head member whereby the rotation of the main driving spindle causes the head member to be slidably displaced along the transverse slot of the guide member, and the projections of the guide member to be laterally reciprocated in their bearings, whereby said head member is caused bodily to traverse a circular path and so rotate the tool spindles simultaneously through their bent members.

JOHN TRUMBLE.
WILLIAM CHARTER HILLMAN.